US009189222B1

(12) United States Patent
Herington

(10) Patent No.: US 9,189,222 B1
(45) Date of Patent: Nov. 17, 2015

(54) UPDATING A COMPUTER SYSTEM

(75) Inventor: Dan Herington, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1180 days.

(21) Appl. No.: 12/259,992

(22) Filed: Oct. 28, 2008

(51) Int. Cl.
*G06F 9/44* (2006.01)
*G06F 9/445* (2006.01)
*G06F 9/50* (2006.01)

(52) U.S. Cl.
CPC ................ *G06F 8/65* (2013.01); *G06F 9/5055* (2013.01)

(58) Field of Classification Search
CPC ................................................ G06F 8/60–8/71
USPC ........... 717/101–178; 711/162, 206; 713/1, 2, 713/100; 714/27; 718/104; 709/221
See application file for complete search history.

(56) References Cited

U.S. PATENT DOCUMENTS 4,679,191 A 7/1987 Nelson
5,179,666 A 1/1993 Rimmer
5,430,845 A 7/1995 Rimmer
5,922,072 A * 7/1999 Hutchinson et al. .............. 713/2
6,044,461 A * 3/2000 Agha et al. ........................ 713/1
6,519,660 B1 2/2003 Rooney
6,542,739 B1 4/2003 Garner
6,587,938 B1 7/2003 Eilert
6,615,365 B1 * 9/2003 Jenevein et al. ............. 714/6.11
6,618,805 B1 * 9/2003 Kampe ............................. 713/1
6,633,977 B1 * 10/2003 Hamilton et al. ............. 713/100
6,698,017 B1 * 2/2004 Adamovits et al. ........... 717/168
6,763,458 B1 * 7/2004 Watanabe et al. ............. 713/100
6,779,176 B1 * 8/2004 Chambers et al. ............ 717/169
7,000,229 B2 * 2/2006 Gere ............................. 717/169
7,051,188 B1 5/2006 Kubala
7,114,100 B2 * 9/2006 Hogdal et al. .................. 714/27
7,130,897 B2 * 10/2006 Dervin et al. ................. 709/221
7,233,331 B2 6/2007 Kato
7,373,468 B1 * 5/2008 Gupta ........................... 711/162
7,509,530 B2 * 3/2009 Welts ............................. 714/15
2001/0012775 A1 8/2001 Modzelesky
2002/0013149 A1 1/2002 Threadgill
2003/0065835 A1 4/2003 Maergner
2004/0117414 A1 * 6/2004 Braun et al. .................. 707/204
2004/0162955 A1 * 8/2004 Jones et al. ................... 711/162
2005/0235278 A1 * 10/2005 Wu et al. ........................ 717/168
2006/0020944 A1 * 1/2006 King et al. .................... 718/104
2006/0095610 A1 5/2006 Arndt
2007/0061372 A1 * 3/2007 Appavoo et al. .............. 707/200
2007/0180206 A1 * 8/2007 Craft et al. .................... 711/162
2008/0263371 A1 * 10/2008 Weissman et al. ............ 713/193
2010/0088500 A1 * 4/2010 Ball et al. ........................ 713/2

OTHER PUBLICATIONS

Live Updating Operating Systems Using Virtualization—Haibo Chen, Rong Chen, Fengzhe Zhang, Binyu Zang—Parallel Processing Institute, Fudan University—Pen-Chung Yew—Department of Computer Science and Engineering, University of Minnesota at Twin-Cities—VEE'06 Jun. 14-16, 2006 Ottawa, Ontario, Canada.*

* cited by examiner

*Primary Examiner* — Jason Mitchell
*Assistant Examiner* — Francisco Aponte
(74) *Attorney, Agent, or Firm* — Wagner Blecher, LLP

(57) ABSTRACT

Updating a computer system. An update root environment is created on the computer system by copying an operational root environment of the computer system. The resources of the computer system used by the update root environment and said operational environment are managed, wherein a first portion of the resources are dedicated to at least the operational root environment. At least one update is performed on the update root environment.

20 Claims, 6 Drawing Sheets

UPDATING A COMPUTER SYSTEM

FIELD

Embodiments of the present invention relate generally to computer systems.

BACKGROUND

Computer systems are commonly and regularly provided with software updates. Updates often require a computer system to either be completely shut down in order to complete or perform the updates or require some amount of downtime where the computer system is running but is only performing update operations. In some situations, attempts are made to configure computer systems to remain running while updates are being performed. Using this type of solution, update operations utilize the same resources as the normal operations of the computer system and still requires some down time to complete and perform all updates. When the update operations utilize the same resources as the normal operations, there is opportunity for the update operations to use excessive amounts of resources resulting in denial of service type situations for the normal operations and otherwise affects the production workloads of the normal operations.

SUMMARY

Various embodiments of the present technology, updating a computer system, are described herein. An update root environment is created on the computer system by copying an operational root environment of the computer system. The resources of the computer system used by the update root environment and said operational environment are managed, wherein a first portion of the resources are dedicated to at least the operational root environment. At least one update is performed on the update root environment.

Figure 1:
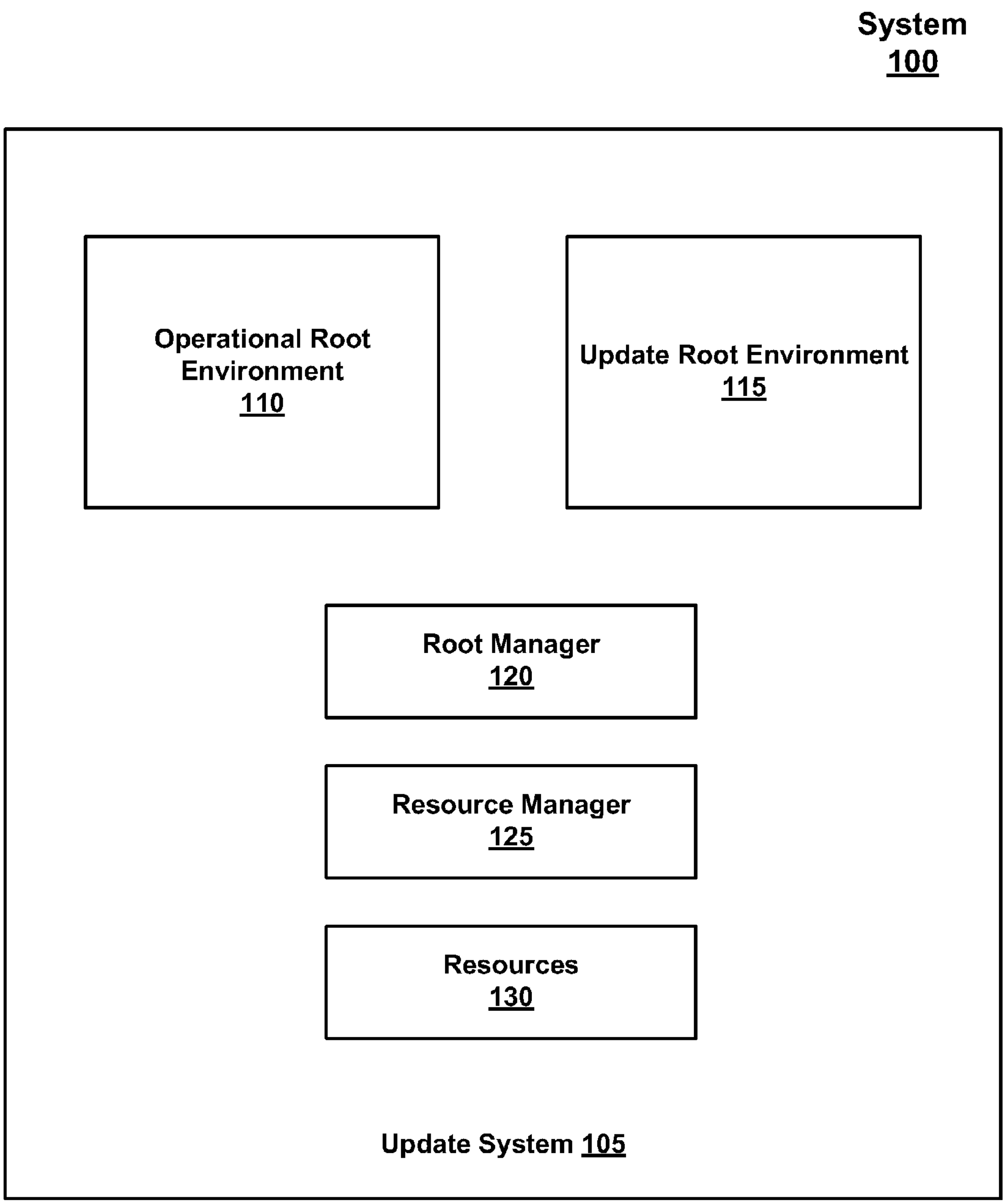
FIG. 1 illustrates a block diagram of an example computer system comprising multiple components in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "creating", "managing", "performing", "dedicating", "constraining", "allowing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Discussion

Embodiments of the present technology are for updating a computer system by creating an update root environment (hereinafter "URE"). For example, the URE is created by copying the operational root environment (hereinafter "ORE"); updates are then made to the URE while the ORE continues to run. Both the URE and the ORE share the same resources of the computer system. The resources of the computer system are then managed to provide portions of the resources to both the URE and the ORE including specific limits that are placed on the portions of the resources. Once the update has been completed, the URE becomes the ORE. This allows the computer system to be updated with little to no downtime, prevents the production workloads of the ORE from being adversely affected during the update and decreases the risk of denial of service type situations.

In the following embodiments, reference is made to "operational root environment" or "ORE". This term is to be interpreted as a typical root environment running on a computer system to perform tasks and operations for which the computer system was intended to perform. It should be appreciated that the operational root environment includes, but is not limited to, the operating system, applications, data, and all tasks and operations associated with these items.

The following discussion will demonstrate various hardware, software, and firmware components that are used with and in the computer system for updating the computer system using various embodiments of the present technology. Furthermore, the computer system and its methods may include some, all, or none of the hardware, software, and firmware components discussed below.

Embodiments of a System for Updating a Computer System

With reference now to FIG. 1, a block diagram of an example system comprising a system for updating a computer system shown in accordance with embodiments of the present technology. System 100 includes update system 105 comprising an operational root environment 110 (hereinafter "ORE 110"), an update root environment 115 (hereinafter "URE 115"), a root manager 120, a resource manager 125 and resources 130. System 100 comprises components that may or may not be used with different embodiments of the present technology and should not be construed to limit the present technology. It should be appreciated that the components of update system 105 can be implemented as software, hardware, firmware, or any combination thereof.

FIG. 1 is drawn to depict, in one embodiment, system 100 with root manager 120 and resource manager 125 as components of update system 105 and can be components of the computer system for which update system 105 is used to update. It should be appreciated that root manager 120 and resource manager 125 may be, but are not limited to, hardware, software, or firmware. Root manager 120 and resource manager 125 may also be coupled together as one component of update system 105. It should also be appreciated that root manager 120 and resource manager 125 need not be components of update system 105 but can be independent components otherwise coupled with update system 105.

In one embodiment, root manager 120 is configured to create URE 115 by duplicating the existing ORE 110. In such an embodiment, ORE 110 and URE 115 are identical upon the creation of URE 115. In one embodiment, root manager 120 uses the chroot operation or tool to create alternate root environments including URE 115. URE 115 may be called or thought of as a copy of an operating system image of ORE 110. Either ORE 110 or URE 115 can be called a dynamic root disk and the actions performed by root manager 120, used to update the computer system, can be called dynamic root disk solutions. Root manager 120 is not limited to duplicating ORE 110 in order to create URE 115 but can use other means such as accessing back up copies of ORE 110 or using original installation files relied on by ORE 110.

Once URE 115 is created, in one embodiment, it is used to perform the update operations for the computer system. During the update operations, ORE 110 continues to run.

Furthermore, in one embodiment, once the update operation is completed, root manager 120 replaces ORE 110 with URE 115. In other words, after the update is complete, URE 115 becomes ORE 110. In one embodiment, a reboot of the computer system is required to replace ORE 110 with URE 115. By creating URE 115 and using it to perform the update operations while allowing ORE 110 to continue to run, downtime due to the update operation is minimized.

Resources 130 include the resources available to the computer system. It should be appreciated that resources 130 are primarily hardware components and consumable resources such as power, but may include firmware or software. In one embodiment, resources 130 include; central processing unit or units both single core and multi-core, random access memory, memory bandwidth, computer readable storage mediums including hard disk drives, optical drives, power sources, power such as watts, input output devices and components, network devices and components, network bandwidth, the resources of the example computer system in FIG. 4, and other resources commonly associated with a computer system. It should be appreciated that resources 130 can be located in, on, around the computer system, but need not be physically part of the computer system. For example, resources 130 can include a hardware component that is communicatively coupled with the computer system, but is also shared with other computer systems.

In one embodiment, resource manager 125 is configured to manage resources 130 available on the computer system. In various embodiments, resource manager 125 will apportion resources 130 so that they are divided between ORE 110 and URE 115. In order to function, resource manager 125 may rely on either hardware or software tools commonly used to manage the resources of a computer system. In one embodiment, resource manager 125 uses a virtual partition tool known as Secure Resource Partition to manage resources 130. In various embodiments, resource manager 125 uses either Processor Sets or Fair Share Scheduler to manage the central processing units. In one embodiment, resource manager 125 uses Memory Resource Groups to manage the random access memory.

In one embodiment, resource manager 125 dedicates portions of resources 130 based on percentages. For example, resource manager 125 can dedicate 10% of all resources 130 available to the computer system to URE 115. In one embodiment, resource manager 125 can use percentages, but can dedicate a different percentage of each available resource to URE 115. For example, resource manager 125 can dedicate 10% of all power, 15% of all random access memory and 25% of all other available resources to URE 115. In one embodiment, resource manager 125 can dedicate portions of resources 130 by assigning a discrete number of available resources to URE 115. For example, the computer system can have ten central processing units. In this example resource manager 125 can dedicate a specific number of processors, such as two, to URE 115. In various embodiments, resource manager 125 can dedicate resources 130 using combinations of percentages and discrete numbers for each type of available resource.

With reference now to FIG. **2*a*, a block diagram of resources 130 of an example computer system comprising, a portion dedicated to operational root environment 202 and a portion dedicated to update root environment 204**.

FIG. **2*a* depicts resources 130, in one embodiment, divided between ORE 110 and URE 115 where such division is static and does not change during the update operation. In such an embodiment, the portion dedicated to URE 204 may not be used by ORE 110 and URE 115 may not use the portion dedicated to ORE 202. In such an embodiment, URE 115 will typically be given the smaller portion of resources, but the resources may be apportioned in anyway desired. In such an embodiment, URE 115 must only use the portion dedicated to URE 204. If URE 115 attempts to use more resources than has been dedicated it, then resource manager 125 will constrain URE 115 to only use the portion of resources dedicated to URE 115**.

In one embodiment, resource manager 125 can dedicate a small portion of resources 130 to the portion dedicated to URE 204 such as 10%. Such constraining will ensure that the portion dedicated to ORE 202 will be available for use by ORE 110. Such constraining will allow URE 115 to perform without affecting the production workloads of ORE 110, nor will a denial of service type situations arise for ORE 110.

With reference now to FIG. **2*b*, a block diagram of resources 130 of an example computer system comprising, a portion dedicated to operational root environment 242 and a portion dedicated to update root environment 244**.

FIG. **2*b* depicts resources 130, in one embodiment, divided between ORE 110 and URE 115 where such divisions do not account for all available resources 130. In such embodiments, the division of resources 130 is dynamic and can change during the update operation. In one embodiment, during the update operation, the portion dedicated to URE 244 is set at an initial amount and may be enlarged to encompass part of the undedicated resources. Such an enlargement can take place if URE 115 is using the entire portion dedicated to URE 244 and can make use of more resources. Once such an enlargement has taken place, it can be later reduced after the URE 115 is not using the portion of resources gained by the enlargement. In such an embodiment, the portion dedicated to ORE 242** can behave in a similar manner.

In one embodiment, if both the portion dedicated to ORE 242 and the portion dedicated to URE 244 attempt to enlarge to encompass the same portion of undedicated resources, priority will be given to the portion dedicated to ORE 242. In one embodiment, if the portion dedicated to URE 244 is enlarged to encompass part of the undedicated portion and that portion is later needed by ORE 110, then resource manager 125 can constrain the portion dedicated to URE 244 to the initial portion dedicated to it before the enlargement. In one embodiment, the initial amounts of the portions of resources 130 set by resource manager 125 are minimum portions guaranteed to ORE 110 and URE 115.

Figure 2A:
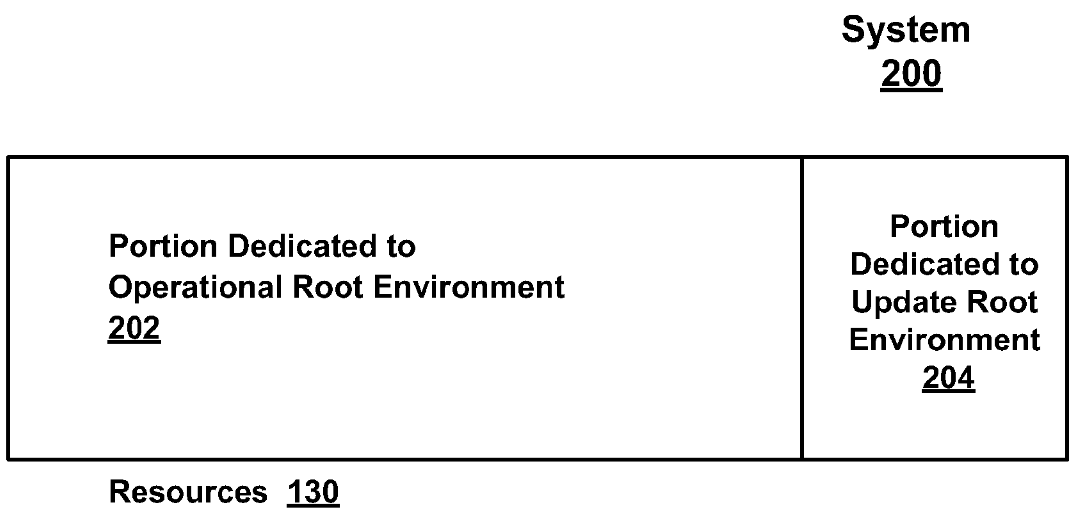
FIG. 2*a* illustrates a block diagram of the resources of the computer system divided into portions in accordance with embodiments of the present technology.
Figure 2B:
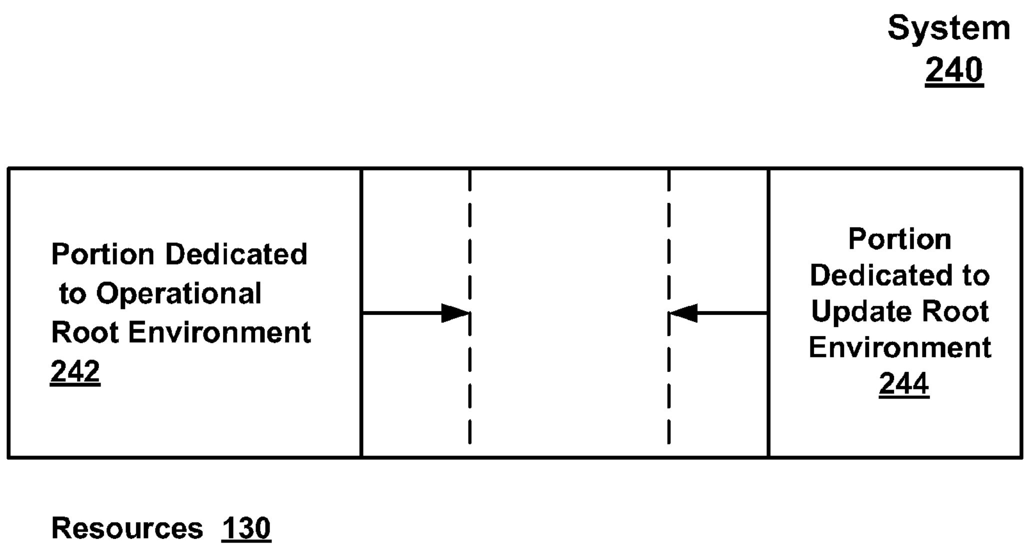
FIG. 2*b* illustrates a block diagram of the resources of the computer system divided into portions in accordance with embodiments of the present technology.
Figure 2C:
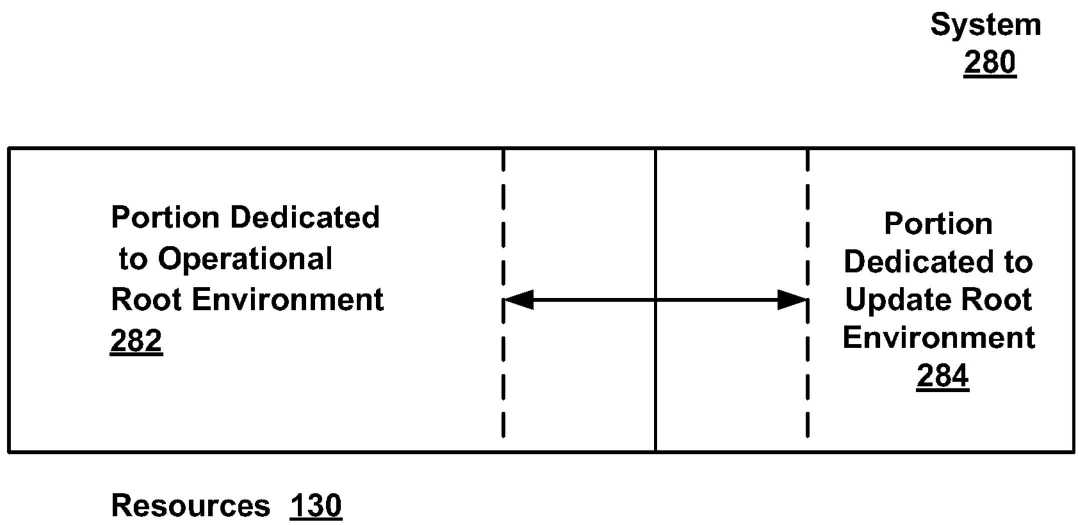
FIG. 2*c* illustrates a block diagram of the resources of the computer system divided into portions in accordance with embodiments of the present technology.

With reference now to FIG. 2*c*, a block diagram of resources 130 of an example computer system comprising, a portion dedicated to operational root environment 282 and a portion dedicated to update root environment 284.

FIG. 2*c* depicts resources 130, in one embodiment, divided between ORE 110 and URE 115 where such division is dynamic and can change during the update operation. In one embodiment, the portion dedicated to ORE 282 and the portion dedicated to URE 284 are set at some initial limit and occupy all of the available resources 130. In such an embodiment, the initial limit may be changed due to the activities and needs of ORE 110 and URE 115. For example, the portion dedicated to URE 284 may initially be 20%, URE 115 is using all 20% but ORE 110 is not using all 80% of resources 130. In this example, the portion dedicated to URE 284 can be increased to include the portion, or part of the portion, dedicated to ORE 282 not being used by ORE 110. Should ORE 110 later require the use of the full 80%, the limit can be changed back to the initial limit. In such an embodiment, the portion dedicated to ORE 282 can behave in a similar manner if the portion dedicated to URE 284 is not using the full amount of resources initially dedicated.

Furthermore, in one embodiment, the initial limits set for the portion dedicated to URE 284 and the portion dedicated to ORE 282 can be changed based on the needs of ORE 110. For example, if the portion dedicated to URE 284 is 15% of available resources and URE 115 is using all 15%, the percentage can be reduced if ORE 110 is using all 85% of resources and can use more. To do so, resource manager 125 will constrain the portion dedicated to URE 284 for a smaller amount of resources and allow ORE 110 to use the now available resources. In such an embodiment, resource manager 125 may set a guaranteed minimum amount of resources for the portion dedicated to URE 284 so that URE 115 may continue to operate even if initial portion dedicated to URE 284 is reduced beyond the initial limit.

Additionally, in one embodiment, the initial limits set for the portion dedicated to URE 284 and the portion dedicated to ORE 282 can be changed based on predetermined factors. In one embodiment, the predetermined factors are the time of day. For example, the portion dedicated to URE 284 may decrease during business hours or may increase during times of day when the computer system typically does not require large amounts of resources 130. In one embodiment, the predetermined factor is when ORE 110 use of resources falls below a certain amount or percentage. For example, the portion dedicated to ORE 282 may be 75% of resources 130, but when ORE 110 is using 30% or less of resources 130, then the portion dedicated to ORE 282 can be reduced to 50%. Then when ORE 110 uses more than 30% of resources 130, the portion dedicated to ORE 282 can return to 75%. Other predetermined factors may be used to dynamically change the initial limits.

Operation

More generally, in embodiments in accordance with the present invention, updating a computer system is utilized to minimize downtime of a computer system while performing updates. Such a method also allows the operational root environment to share resources with the update root environment without affecting the production workload of the operational root environment.

Figure 3:
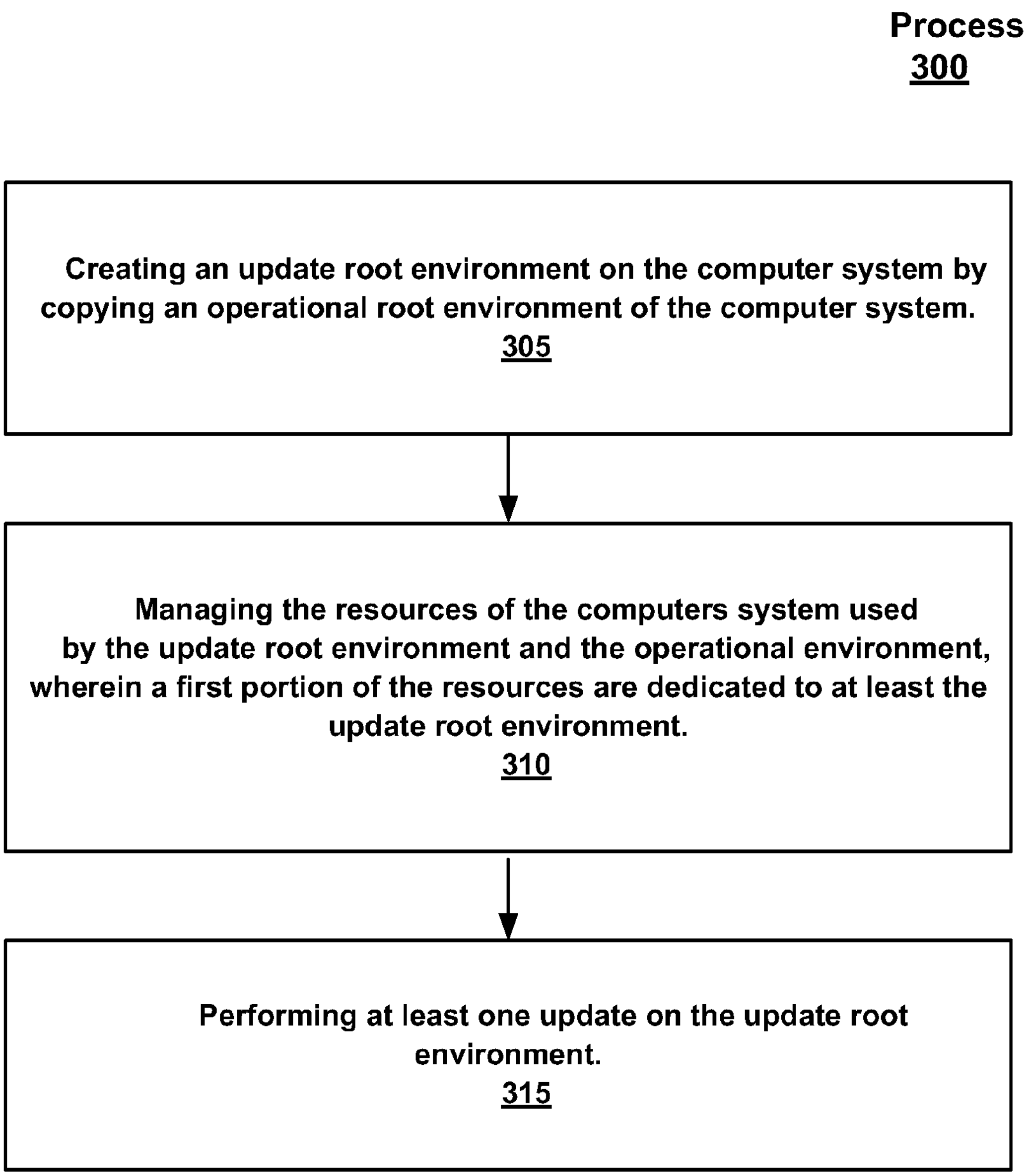
FIG. 3 illustrates a flowchart of an example method for updating a computer system in accordance with embodiments of the present technology.

FIG. 3 is a flowchart illustrating process 300 for updating a computer system, in accordance with one embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 300 is performed by root manager 120 and resource manager 125 of FIG. 1.

In one embodiment, process 300 is used to update the computer system. At 305, in one embodiment, an update root environment is created on the computer system by copying an operational root environment of the computer system. This is done to ensure that the update root environment contains all aspects and parts of the operational root environment which is necessary because the update root environment will become the operational root environment once the update is completed. Next, at 310, the resources of the computer system used by the update root environment and the operational environment are managed, wherein a first portion of the resources are dedicated to at least the update root environment. Then, at 315, at least one update is performed on the update root environment.

By managing the resources and dedicating a portion of the resources to update root environment at 310, the update process will ensure that the update root environment will have access to a portion of the resources on which to operate. In one embodiment, the update root environment is required to stay within the portion of the resources dedicated to it in the first portion and the update root environment will be constrained should it attempt to access more of the resources. In one embodiment, the first portion of the resources will be dedicated to the operational root environment. In one embodiment, the resources will be managed in such a way that there will be two portions dedicated, one to the update root environment and one to the operational root environment. In such an embodiment, the two dedicated portions may account for all of the available resources of the computer system or not.

In one embodiment, where both a first and second portion of the resources have been dedicated, either the update root environment or the operational root environment will be allowed to access the resources of the portion which is not dedicated to it should the other root environment not be using the portion of the dedicated resources. In one embodiment, where the first and second dedicated portion of resources do not account for all of the available resources, either the update root environment or the operational root environment can access the undedicated portion of resources. In such an embodiment, priority will be given to the operational root environment for access to the undedicated portion of the resources.

In one embodiment, the update root environment will be allowed to use all of said resources until a specified event takes place. Such a specified event could be a predetermined time frame or could be based on predetermined factors as described above.

Example Computer System Environment

Figure 4:
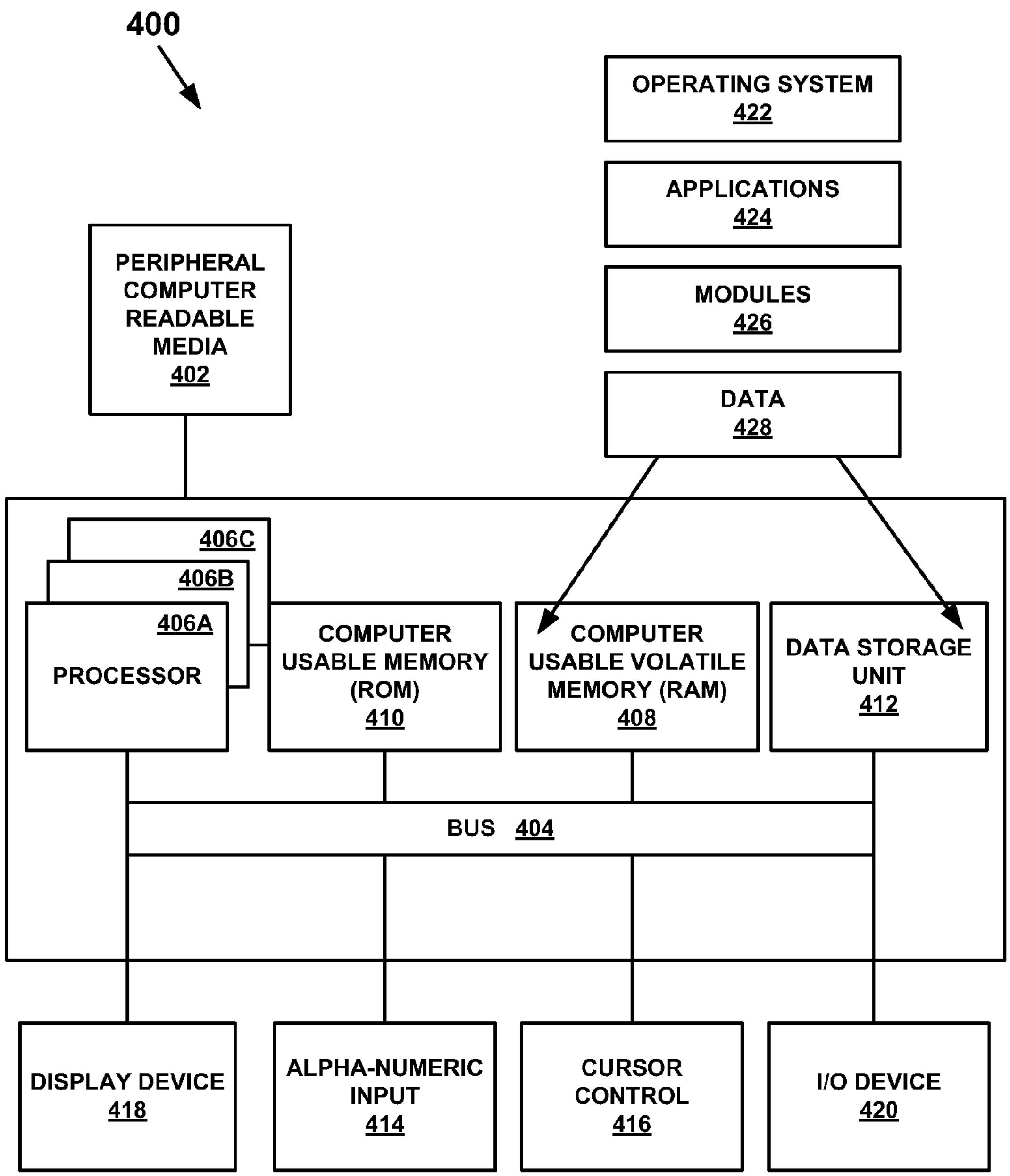
FIG. 4 illustrates a diagram of an example computer system upon which embodiments of the present technology may be implemented.

With reference now to FIG. 4, portions of embodiments of the technology for providing a communication composed of computer-readable and computer-executable instructions that reside, for example, in computer-usable media of a computer system. That is, FIG. 4 illustrates one example of a type of computer that can be used to implement embodiments of the present technology.

FIG. 4 illustrates an example computer system 400 used in accordance with embodiments of the present technology. It is appreciated that system 400 of FIG. 4 is an example only and that embodiments of the present technology can operate on or within a number of different computer systems including general purpose networked computer systems, embedded computer systems, routers, switches, server devices, user devices, various intermediate devices/artifacts, stand alone computer systems, mobile phones, personal data assistants, and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. Embodiments of the present technology may be applied to one or more elements of described system 400. For example, a method of modifying user interface 225A of device 115A may be applied to operating system 422, applications 424, modules 426, and/or data 428.

The computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for updating a computer system, comprising:

creating an update root environment on the computer system by copying an operational root environment of the computer system;

setting to the update root environment and the operational root environment an initial portion of dedicated resources, wherein the initial portions of resources are minimum portions of resources guaranteed to the update root environment and the operational root environment; and performing an update in the update root environment, and during the update:

if the update root environment and the operational root environment are utilizing all of entire initial portion of dedicated resources, dynamically enlarging the initial portion of dedicated resources to encompass additional resources that are a part of undedicated resources;

after the enlargement, if the update root environment and the operational root environment are not utilizing the additional resources gained by the enlargement, reducing to the initial portion of dedicated resources; and if both of the portions dedicated to the update root environment and the operational root environment attempt to dynamically enlarge to encompass the same portion of undedicated resources, constraining the portion dedicated to the update root environment to the initial portion dedicated before the enlargement.

2. The method of claim 1, comprising constraining the update root environment from accessing the portion of the resources dedicated to the operational root environment.

3. The method of claim 1, comprising allowing the update root environment and the operational root environment to access an undedicated portion of the resources.

4. The method of claim 1, comprising allowing the operational root environment to access unused resources not dedicated to the operational root environment while the unused resources are not accessed by the update root environment.

5. The method of claim 4, wherein the operational root environment has priority access to the unused resources over the update root environment.

6. The method of claim 1, comprising allowing the operational root environment to use all of the resources until a specified event takes place.

7. The method of claim 1, wherein a resource manager allocates the resources on a percentage basis.

8. The method of claim 7, comprising dedicating a portion of power, a portion of memory, or a portion of storage, or any combinations thereof to the update root environment.

9. The method of claim 1, comprising dedicating a discrete number of available resources to the update root environment.

10. A system for updating a computer system, the system comprising:

resources comprising a processor, a memory, power, or a storage, or any combinations thereof;

an operational root environment comprising an operating system for the computer system;

a root manager comprising instructions to direct the processor to:

create an update root environment by duplicating the operational root environment; and perform an update on the update root environment; and a resource manager comprising instructions to direct the processor to:

set to the update root environment and the operational root environment an initial portion of dedicated resources, wherein the initial portions of resources are minimum portions of resources guaranteed to the update root environment and the operational root environment; and if the update root environment and the operational root environment are utilizing all of the initial portion of dedicated resources, dynamically enlarging the initial portion of dedicated resources to encompass additional resources that are a part of undedicated resources;

after the enlargement, if the update root environment and the operational root environment are not utilizing the additional resources gained by the enlargement, reducing to the initial portion of dedicated resources; and if both of the portions dedicated to the update root environment and the operational root environment attempt to dynamically enlarge to encompass the same portion of undedicated resources, constraining the portion dedicated to the update root environment to the initial portion dedicated before the enlargement.

11. The system of claim 10, wherein the resource manager comprises instructions to direct the processor to:

dedicate a portion of the resources to the update root environment; and prevent the update root environment from accessing resources in use by the operational root environment.

12. The system of claim 11, wherein the resource manager sets a guaranteed minimum amount of resources for the portion dedicated to the update root environment to allow the update root environment to operate.

13. The system of claim 10, wherein the resource manager comprises instructions to direct the processor to apportion resources between the operational root environment and the update root environment on a percentage basis.

14. The system of claim 13, wherein the resources apportioned on the percentage basis include a random access memory, a power, a storage unit, or any combinations thereof.

15. The system of claim 10, wherein the resource manager comprises instructions to direct the processor to assign a discrete number of resources to each of the operational root environment and the update root environment.

16. The system of claim 15, wherein the discrete number of resources include a specific number of processors.

17. The system of claim 10, wherein the resource manager comprises instructions to direct the processor to enlarge the portion of the resources assigned to the update root environment by assigning unassigned resources.

18. A non-transitory computer readable storage medium comprising instructions thereon when executed cause a computer system to perform a method for updating a computer system, the method comprising:

creating an update root environment on the computer system by copying an operational root environment of the computer system;

setting to the update root environment and the operational root environment an initial portion of dedicated resources, wherein the initial portions of resources are minimum portions of resources guaranteed to the update root environment and the operational root environment; and performing an update in the update root environment, and during the update:

if the update root environment and the operational root environment are utilizing all of the initial portion of dedicated resources, dynamically enlarging the initial portion of dedicated resources to encompass additional resources that are a part of undedicated resources;

after the enlargement, if the update root environment and the operational root environment are not utilizing the additional resources gained by the enlargement, reducing to the initial portion of dedicated resources; and if both of the portions dedicated to the update root environment and the operational root environment attempt to dynamically enlarge to encompass the same portion of undedicated resources, constraining the portion dedicated to the update root environment to the initial portion dedicated before the enlargement.

19. The non-transitory computer readable storage medium of claim 18, wherein the method further comprises preventing the operational root environment from accessing the portion of the resources dedicated to the update root environment.

20. The non-transitory computer readable storage medium of claim 18, wherein the method further comprises allowing the update root environment, or the operational root environment or both to access an undedicated portion of the resources.

* * * * *